United States Patent
Brugler et al.

(10) Patent No.: US 9,880,916 B2
(45) Date of Patent: Jan. 30, 2018

(54) MANAGEMENT OF SYSTEM EVENTS USING ONE OR MORE EVENT ATTRIBUTES

(71) Applicant: International Business Machines Corporation, Armonk, NY (US)

(72) Inventors: Thomas S. Brugler, Fuquay-Varina, NC (US); Vincent C. Conzola, Raleigh, NC (US); Randall A. Craig, Raleigh, NC (US); John P. Franks, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 13/626,225

(22) Filed: Sep. 25, 2012

(65) Prior Publication Data

US 2014/0089479 A1  Mar. 27, 2014

(51) Int. Cl.
G06F 15/16 (2006.01)
G06F 11/30 (2006.01)
G06F 11/32 (2006.01)

(52) U.S. Cl.
CPC ........ G06F 11/3075 (2013.01); G06F 11/321 (2013.01); *G06F 2201/86* (2013.01)

(58) Field of Classification Search
CPC ........ G06F 9/542; G06F 11/30; G06F 15/173; H04L 67/42; H04L 63/14; G06Q 10/08; G06Q 10/0631
See application file for complete search history.

(56) References Cited

U.S. PATENT DOCUMENTS

| | | | |
|---|---|---|---|
| 5,559,958 A | 9/1996 | Farrand et al. | |
| 6,018,567 A | 1/2000 | Dulman | |
| 6,456,306 B1 | 9/2002 | Chin et al. | |
| 6,640,249 B1 | 10/2003 | Bowman-Amuah | |
| 6,985,967 B1 * | 1/2006 | Hipp | G06F 1/184 |
| | | | 361/788 |

(Continued)

FOREIGN PATENT DOCUMENTS

CN  101776996 A  7/2010

OTHER PUBLICATIONS

Becker, S. and Flick, G., "A Practical Approach to Failure Mode, Effects and Criticality Analysis (FMECA) for Computing Systems", High-Assurance Systems Engineering Workshop, 1996. Proceedings., IEEE. pp. 228-236, Published 1996, © 1997 IEEE. DOI: 10.1109/HASE.1996.618602.

(Continued)

*Primary Examiner* — Younes Naji
(74) *Attorney, Agent, or Firm* — Christopher M. Coy (57) ABSTRACT

A method for managing a system may include gathering, with a system manager, data about a first system event and a second system event. The method further includes determining, with the system manager, a plurality of first system event attribute values and a plurality of second system event attribute values. The first and second system event attribute values are based on the data gathered about the first and second system event. The method further includes generating, with the system manager, a display of the plurality of first system event attribute values in hierarchal relation to the plurality of second system event attribute values.

18 Claims, 7 Drawing Sheets

(56) References Cited

U.S. PATENT DOCUMENTS

| | | |
|---|---|---|
| 7,120,559 B1 | 10/2006 | Williams et al. |
| 7,231,550 B1 | 6/2007 | McGuire et al. |
| 7,424,666 B2 | 9/2008 | Chandwani et al. |
| 7,428,723 B2* | 9/2008 | Greene .......... G06Q 10/063112 |
| | | 709/201 |
| 7,849,185 B1* | 12/2010 | Rockwood .............. H04L 63/14 |
| | | 707/717 |
| 8,005,733 B2 | 8/2011 | Subbu et al. |
| 9,007,229 B1* | 4/2015 | Wakim ................... G08B 13/12 |
| | | 340/540 |
| 2002/0070953 A1* | 6/2002 | Barg ....................... G06Q 10/10 |
| | | 715/700 |
| 2004/0201612 A1* | 10/2004 | Hild ......................... H04L 41/22 |
| | | 715/736 |
| 2006/0247957 A1* | 11/2006 | Gopfert .................. G06Q 40/08 |
| | | 705/35 |
| 2007/0022000 A1* | 1/2007 | Bodart .................... G06Q 10/10 |
| | | 705/7.38 |
| 2008/0126858 A1* | 5/2008 | Barras .................... G06F 11/327 |
| | | 714/25 |
| 2008/0201287 A1* | 8/2008 | Takeuchi ............... G06Q 30/08 |
| | | 706/46 |
| 2008/0307269 A1* | 12/2008 | Bennett ................. G06F 11/079 |
| | | 714/47.2 |
| 2009/0085917 A1* | 4/2009 | Fuller ................... G06T 11/206 |
| | | 345/440.1 |
| 2010/0057660 A1* | 3/2010 | Kato ..................... G06F 11/008 |
| | | 706/47 |
| 2010/0077388 A1* | 3/2010 | Kimura ............... G06F 11/3466 |
| | | 717/158 |
| 2010/0274596 A1 | 10/2010 | Grace et al. |
| 2011/0225622 A1 | 9/2011 | Pearcy et al. |
| 2011/0270836 A1* | 11/2011 | Yang ....................... G06Q 10/10 |
| | | 707/737 |
| 2012/0023221 A1* | 1/2012 | Dayan ................. G06F 11/3006 |
| | | 709/224 |
| 2013/0097662 A1* | 4/2013 | Pearcy .................. G06F 21/577 |
| | | 726/1 |
| 2013/0117327 A1* | 5/2013 | Chmiel ............. G06F 17/30241 |
| | | 707/802 |
| 2013/0197965 A1* | 8/2013 | Leitch ................ G06Q 10/0635 |
| | | 705/7.28 |
| 2013/0212158 A1* | 8/2013 | Lehto ...................... H04L 67/42 |
| | | 709/203 |
| 2014/0040785 A1* | 2/2014 | Munday ................ G06F 9/4443 |
| | | 715/760 |
| 2014/0071832 A1* | 3/2014 | Johnsson ................ H04L 43/10 |
| | | 370/242 |
| 2014/0146648 A1* | 5/2014 | Alber ................... G11B 27/002 |
| | | 369/53.1 |
| 2015/0286949 A1* | 10/2015 | Ivanov ................... G06N 5/048 |
| | | 706/52 |

OTHER PUBLICATIONS

Konrad, S. and Cheng, B., "Requirements Patterns for Embedded Systems", Proceedings of the IEEE Joint International Conference on Requirements Engineering (RE02), Essen, Germany, Sep. 2002.

Spencer et al., "Error Message Recording and Reporting in the SLC Control System", IEEE Transactions on Nuclear Science, vol. NS-32, No. 5, pp. 2120-2122, Oct. 1985. DOI: 10.1109/TNS.1985.4333835.

* cited by examiner

FIG. 1

| EVENT DATA ATTRIBUTES VALUE TABLE ||
|---|---|
| Event Attributes | Attribute Value |
| Event ID | Name |
| Event Description | Type |
| Time/Date of Event | HH:MN:SS, MM/DD/YYYY |
| Duration of Event | HH:MN:SS |
| Source | Root Source of Event |
| Co-Factors | Related Events |
| Progress/State of Resolution | New, Acknowledged, Working, Resolved, Closed |
| Importance | 0-10 |
| Time Sensitivity | 0-10 |
| Urgency | 0-10 |
| Risk | 0-10 |
| Resolvability | 0-10 |
| Potential to Ripple | 0-10 |
| Redundancy | 0-10 |
| Ownership and Roles | 0-10 |
| Frequency | 0-10 |
| Scope | 0-10 |
| Fuzziness | 0-10 |
| Service Level Agreements (SLAs) | 0-10 |
| Cost | 0-10 |

MANAGEMENT OF SYSTEM EVENTS USING ONE OR MORE EVENT ATTRIBUTES

FIELD

The present invention generally relates to system management, and more specifically, the determination of event attributes.

BACKGROUND

Computer networks or systems may include many components such as servers, cooling systems, clients, and switches. Each of these components may also have many sub-components such as memory, independent cooling systems, network adapters, and processors for example. Like most things, the components and sub-components of systems malfunction. Some malfunctions may affect the systems minimally while some malfunctions will be catastrophic to the systems if not resolved quickly.

SUMMARY

One embodiment is directed to a method for managing a system. The method includes gathering, with a system manager, data about a first system event and a second system event. The method further includes determining, with the system manager, a plurality of first system event attribute values and a plurality of second system event attribute values. The first and second system event attribute values are based on the data gathered about the first and second system event. The method further includes generating, with the system manager, a display of the plurality of first system event attribute values in hierarchal relation to the plurality of second system event attribute values.

Another embodiment is directed to a computer readable storage medium having instructions stored thereon which, when executed, cause a processor to perform the method described above.

BRIEF DESCRIPTION OF THE DRAWINGS

In the drawings and the Detailed Description, like numbers generally refer to like components, parts, steps, operations, and processes.

DETAILED DESCRIPTION

A major and complex problem today is managing computer networks or systems. The number of systems and the ever increasing size of systems make management of systems a difficult task when problems, errors, or other events arise. Event management of systems is one of the most important, yet least satisfied, set of tasks for system administrative users. The amount of events, the complexity of events, and roles system administrative users have in responding to events are but a few examples of how difficult it is to manage events on a system. Furthermore, there are many reasons for event management being a difficult task such as the number of interactions of the products, poor messages, and lack of detail.

User interfaces that present the events to administrative users are one such difficulty. These user interfaces are often oversimplified, one-dimensional user interfaces. Typically, the dimension may have a scale such as Critical, Warning, Information, and OK/Normal. This provides very little information when there are usually many attributes that may be related to and involved in the event, as will be discussed below. Having a user interface that allows the user to view the events in relation to other events using multiple event data attributes may allow the user to better manage the system and prioritize events.

Figure 1:
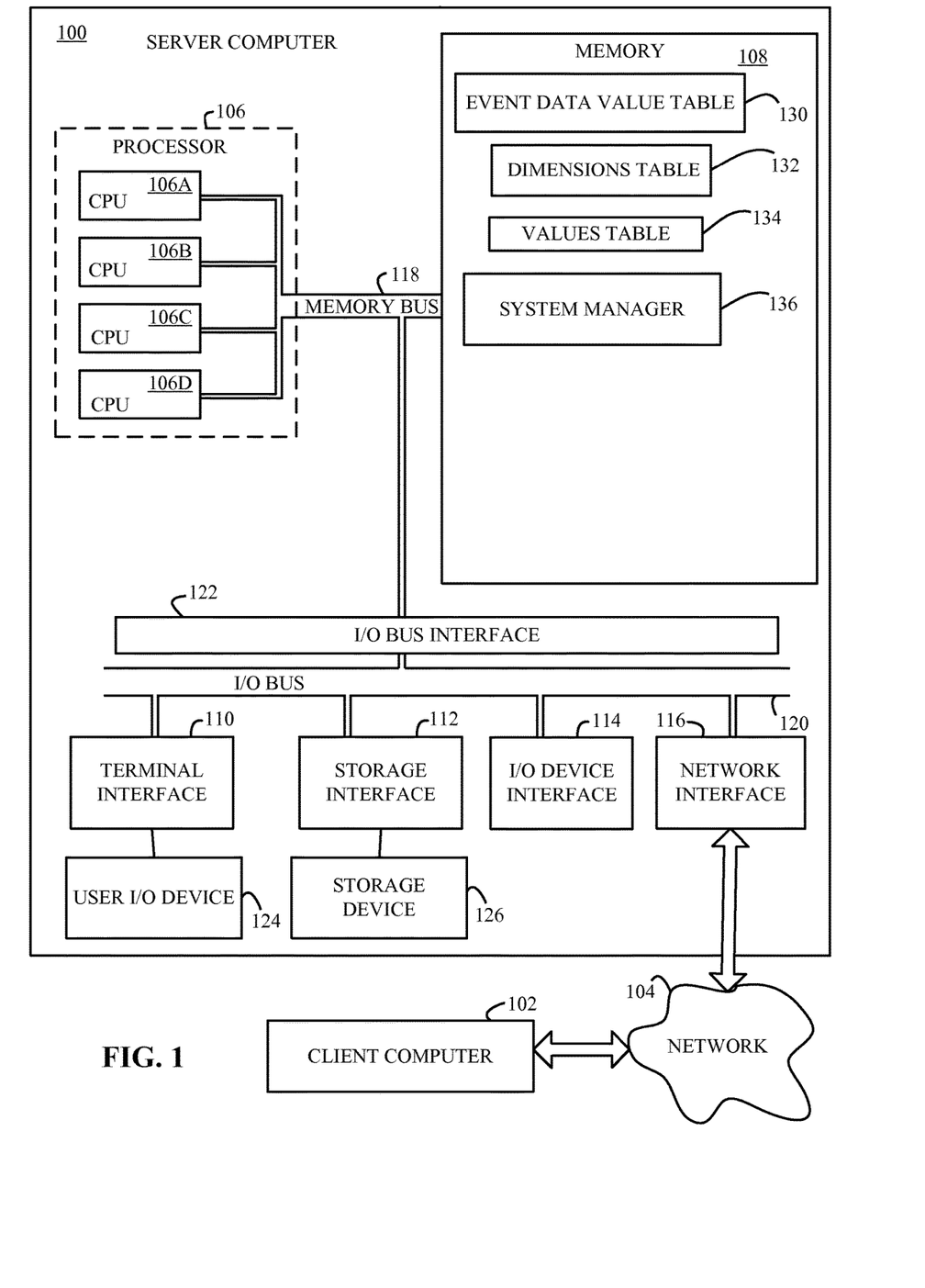
FIG. 1 depicts a high-level block diagram of an exemplary system for implementing an embodiment.

Referring to the drawings, wherein like numbers denote like parts throughout the several views, FIG. 1 depicts a high-level block diagram representation of a server computer system 100 connected to a client computer system 102 via a network 104, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode an event data value table 130, a dimensions table 132, a values table 134, and a system manager 136. Although the event data value table 130, the dimensions table 132, the values table 134, and the system manager 136 are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the event data value table 130, the dimensions table 132, the values table 134, and the system manager 136 are illustrated as being contained within the main memory 108, these elements are not necessarily completely contained in the same storage device at the same time. Further, although the event data value table 130, the dimensions table 132, the values table 134, and the system manager 136 are illustrated as being separate entities, in other embodiments some of them, portions of some of them, or all of them may be packaged together.

In an embodiment, the event data value table 130, the dimensions table 132, the values table 134, and the system manager 136 may include instructions or statements that execute on the processor 106 or instructions or statements that may be interpreted by instructions or statements that execute on the processor 106, to carry out the functions as further described below with reference to FIGS. 2, 3A, 3B, 4, 5, 6, and 7. In another embodiment, the event data value table 130, the dimensions table 132, the values table 134, and the system manager 136, or two or more of these elements may be implemented in hardware via semiconductor devices, chips, logical gates, circuits, circuit cards, other physical hardware devices, or a combination of these devices in lieu of, or in addition to, a processor-based system. In an embodiment, the event data value table 130, the dimensions table 132, the values table 134, and the system manager 136, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100 to other digital devices and computer systems 102; such paths may include, e.g., one or more networks 104.

Figure 2:
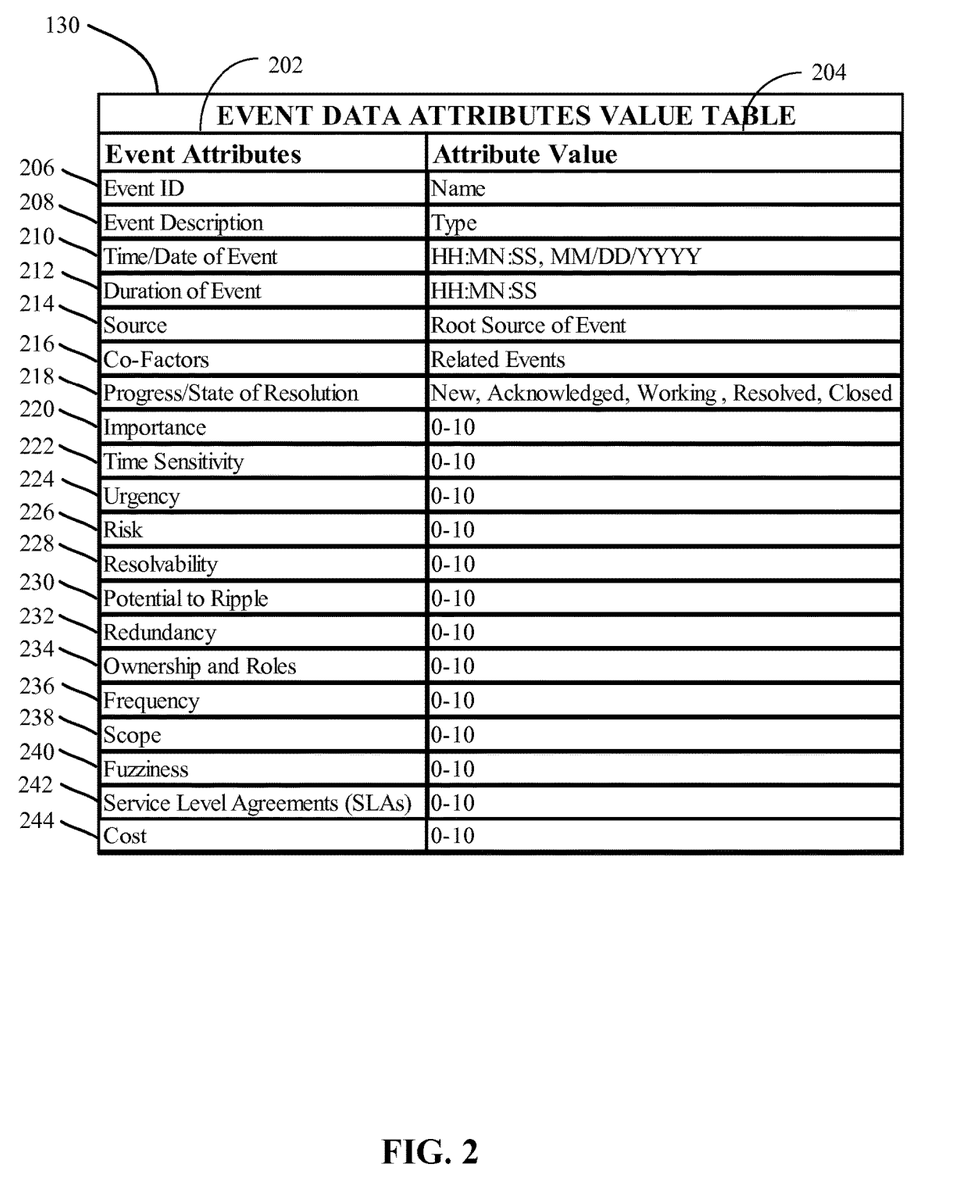
FIG. 2 depicts a block diagram of an example data structure for an event value attribute table, according to an embodiment.

FIG. 2 depicts a block diagram of an example data structure for an event data attribute value table 130, according to one embodiment. The event data attribute value table 130 may be created by the system manager 136. The event data attribute value table 130 may include event attributes 202 and the attribute values 204. The event attributes 202 may include the attributes: event ID 206, the event description 208, time/date of event 210, duration of event 212, source 214, co-factors 216, progress/state of resolution 218, importance 220, time sensitivity 222, urgency 224, risk 226, resolvability 228, potential to ripple 230, redundancy 232, ownership and roles 234, frequency 236, scope 238, fuzziness 240, service level agreements (SLAs) 242, and cost 244. The values 204 contained in the fields may represent the attribute values of the system event. This information may be received from any system source. Sources may include components of the system, which may include sensors that detect and send data about the components of the system. The data may also be received from users of the system manager 136. In other embodiments, the data may be received from one or more systems. In yet other embodiments, data from other attributes not listed may be added to the event data attribute value table 130.

According to an embodiment, the event ID attribute 206 may identify the name of the event in which the attribute values 204 applies. The event description attribute 208 may provide a description of the event such as what the event is. The time/date attribute 210 may provide the day and time the event occurred. The duration attribute 212 may provide how long the event has been occurring. The source attribute 214 may include data as to what is the root source of the event. The co-factors attribute 216 may list whether the event is a standalone event or if other system events are causing the event. The progress/state of resolution attribute 218 may include data about the status of the event or what kind of response has already been taken as a result of the event. For example, if the attribute data of the progress/state of resolution attribute 218 may be New, Acknowledged, Working, Resolved, or Closed.

Other event attributes 202 may include the importance attribute 220, which may include information on the importance of the event such as the overall impact of the event on the system 100. Also, some components may be more critical than others, e.g., external facing database transactions versus internal development and mail servers. The system manager 136 may use data of the event and other event attributes to determine the importance attribute 220. In another embodiment, the user may determine the importance 220 of the event. The time sensitivity attribute 222 may include data on how quickly an event may need to be addressed. The urgency attribute 224 may be a combination of other attributes such as importance and time sensitivity. In one embodiment, event attributes may influence or contribute to other event attributes.

The risk attribute 226 may include the odds on more components incurring events based on the redundancy of the subcomponents within the components, e.g., a single drive failure in RAID 5 may not be disastrous but a redundant, second drive failure would be disastrous. The resolvability attribute 228 may include data on the difficulty of resolving the event. Some users may benefit from the resolvability attribute 228 when applying it to user load distribution and queuing. The potential to ripple attribute 230 may include information on whether one event could lead to another event. The redundancy attribute 232 may include data on the amount of backups configured in the system. The ownership and roles attribute 234 may include data on the user's ownership in fixing issues or problems. A user may enter the user's credentials and the ownership into the system manager 136 and the duties of the user's position may affect other attributes. The frequency attribute 236 may include data on how frequent the event arises. Some events may occur repeatedly while other events are intermittent. The scope attribute 238 may include data regarding how much of the system the system event is impacting, e.g., a single subcomponent may be affected or the entire system may be affected. The fuzziness attribute 240 may include data on how defined the system event is. The event may be known otherwise it may be categorized as unknown, undefined, or indeterminate. The SLA attribute 242 may include data about the levels of coverage that service agreements cover in relation to the event. The cost attribute 244 may include the estimated cost of the resolving an event.

Each event attribute 202 may contain the specific attribute value 204 of each attribute 202. The attribute value 204 may also be scaled for each event attribute 202 in a hierarchal form such as a range where an attribute of the system event is compared to the same attribute of other system events. This range may also be referred to as the attribute value. Likewise, each separate attribute may be normalized to easily compare attributes to each other. In the event data attribute value table 130, some of the attributes may be given a number range 1-10 by the system manager 136 where the higher the number may represent the higher the severity. This range may normalize each attribute to better manage the events. For instance, cost attribute 244 may be measurable in dollars while the potential to ripple attribute 230 may be determined by the number of other components reliant on the event component or some other unquantifiable factor. The system manager 136 may have instructions to normalize the two attributes 230, 244 such that an event that costs $500-$750 to repair may receive an attribute value of 5 while an event that costs $750-$1000 may receive an attribute value of 6. If a component such as a fan does not work, the system manager 136 may categorize the attribute value of that event as a 3 according to instructions in the system manager 136. However, if a component that controls several fans that cool processors in the system is faulty, then the system event may be given an attribute value of an 8 since the there is a higher potential for more fans to go down, which may cause the processors to overheat. If the processors overheat, then other components in the system may not function properly.

Figure 3A:
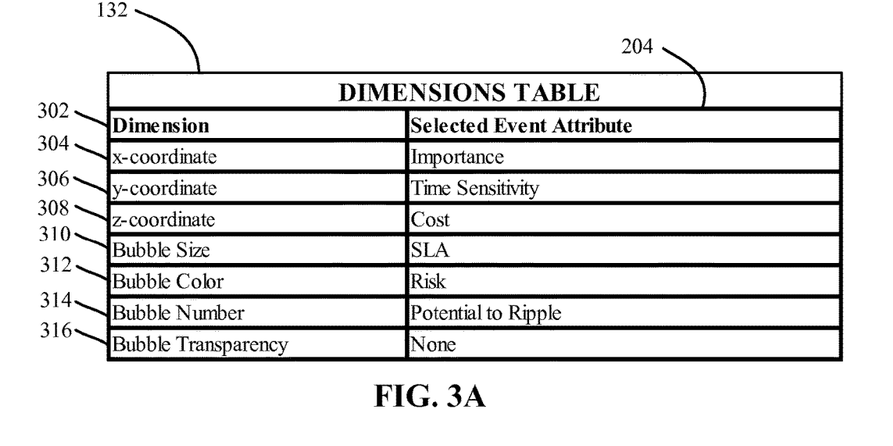
FIG. 3A depicts a block diagram of an example data structure for a dimensions table, according to an embodiment.

FIG. 3A depicts a block diagram of an example data structure for the dimensions table 132, according to one embodiment. The system manager 136 may create the dimensions table 132. The dimensions table 132 may include the graph dimensions 302 and the event attributes 202. The event attributes 202 may be selected by the user to correspond with a graph dimension 302. The graph dimensions 302 may include, but are not limited to, an x-coordinate 304, a y-coordinate 306, a z-coordinate 308, a bubble size 310, a bubble color 312, a bubble number 314, and a bubble transparency 316. Each graph dimension 302 may have a selected event attribute 202. For instance, in table 132 the x-coordinate 304 may represent the importance attribute 220. The y-coordinate 306 may represent the time sensitivity attribute 222. The z-coordinate 308 may represent the cost attribute 244. The bubble size 310 may represent the SLA 242. The bubble color 312 may represent the risk attribute 226. The bubble number 314 may represent the potential to ripple attribute 230. The bubble transparency 316 may represent no attribute and therefore may not be featured on the display.

Figure 3B:
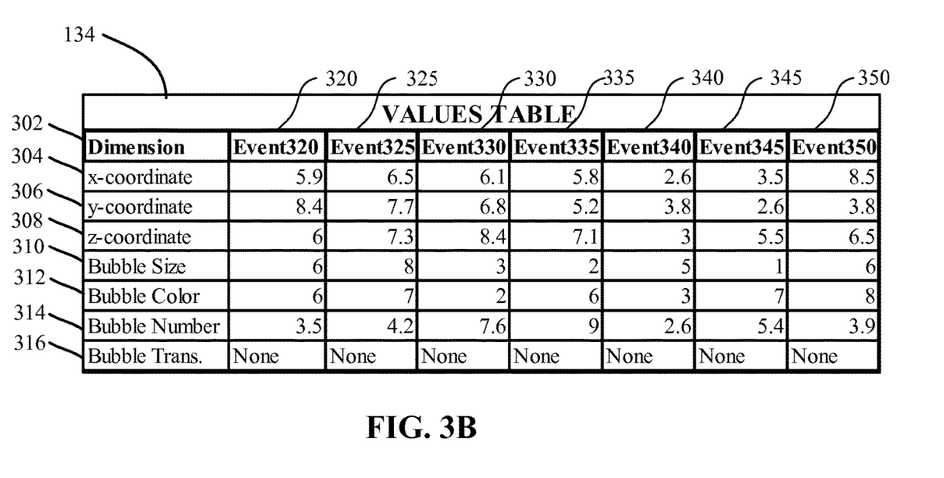
FIG. 3B depicts a block diagram of an example data structure for a value table, according to an embodiment.

FIG. 3B depicts a block diagram of an example data structure for values table 134, according to one embodiment. The values table 134 may be created by the system manager 136. The values table 134 may include the dimensions 302. The values table 134 may also include each event by their event ID 206. As illustrated as an example in FIG. 3B, events 320, 325, 330, 335, 340, 345, and 350 may make up the table. Each event may have its own event data attributes value table 130. The system manager 136 may place the attribute value 204 from the event data attribute value table 130 for each event into the values table 134 according to the event and the event attribute 202 paired to each dimension 302 in the dimensions table 132. For instance, the attribute value of 5.9 in the event 320 column and in the x-coordinate row in values table 134 represents the attribute value of the importance attribute 220 of event 320.

Figure 4:
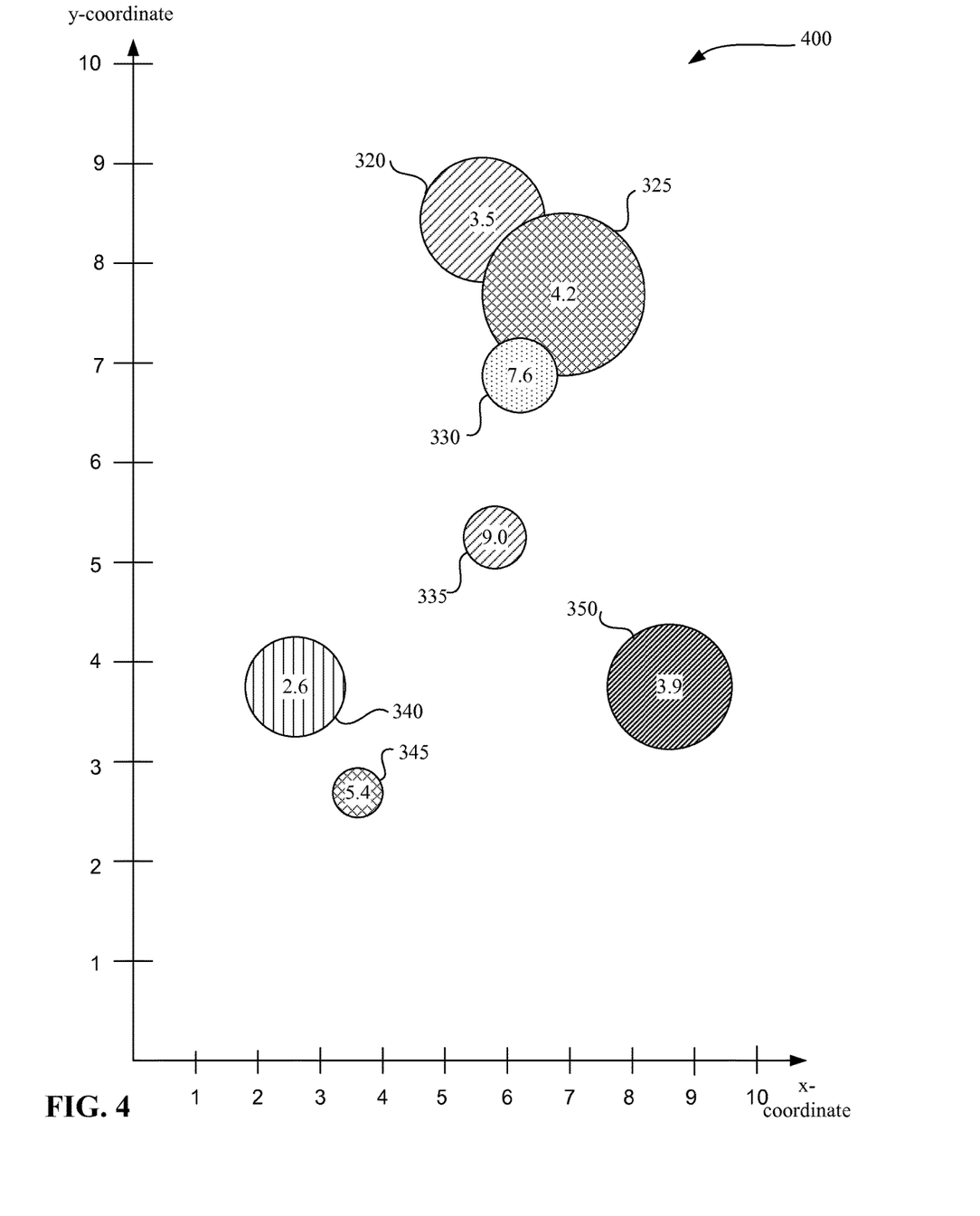
FIG. 4 depicts a graphical display of a user interface, according to an embodiment.

FIG. 4 illustrates a graphical display of graph 400, according to one embodiment. The system manager 136 may create graph 400 from the data in the tables 130, 132, and 134. A user may use the graph 400 to prioritize events occurring in the system. The graph 400 may display the events 320, 325, 330, 335, 340, 345, and 350 as bubbles or circles, as an example. Graph 400, as illustrated, may display the x-coordinates 304 and the y-coordinates 306. In other embodiments, the z-coordinates 308 may also be displayed or displayed in place of the x-coordinate 304 or y-coordinate 306. The representation of the z-coordinates 308 may be seen from the bubbles representing events 320, 325, and 330. Event 330 has a higher attribute value in the z-coordinate 308 row of the values table 134 than event 325, which in turn is higher than event 320. Therefore, in graph 400 the bubble representing event 330 is illustrated as being on top of event 325, which in turn is on top of event 320. The bubble size dimension 310 may be seen by the various sized bubbles. The larger the attribute value is for each event in values table 134 for the SLA attribute 242, the larger the bubble is in graph 400, according to one embodiment. The color dimension 312 may be seen by the different hash mark styles in each bubble. The bubble number dimension 314 may be seen by the numbers located in the center of the bubbles.

In one embodiment, the graph 400 may be in the form of an interactive report, in that the user may control and vary the dimensions and their scopes in the graph display. For instance, the user could pick another dimension in a drop-down list to add to the graphical display. In another embodiment, the user may change one of the attributes assigned to a dimension to another attribute e.g., the user may change the bubble size dimension 310 from the SLA attribute 242 to the resolvability attribute 228.

In another embodiment, the graph 400 may have a mode where the attribute choices automatically vary in respect to the attributes selected to be shown. For example, the four most interesting or varying attributes show on the graphical display 400 while the attributes of the events, which are similar to each other in their attribute values, do not show up on graph 400.

Figure 5:
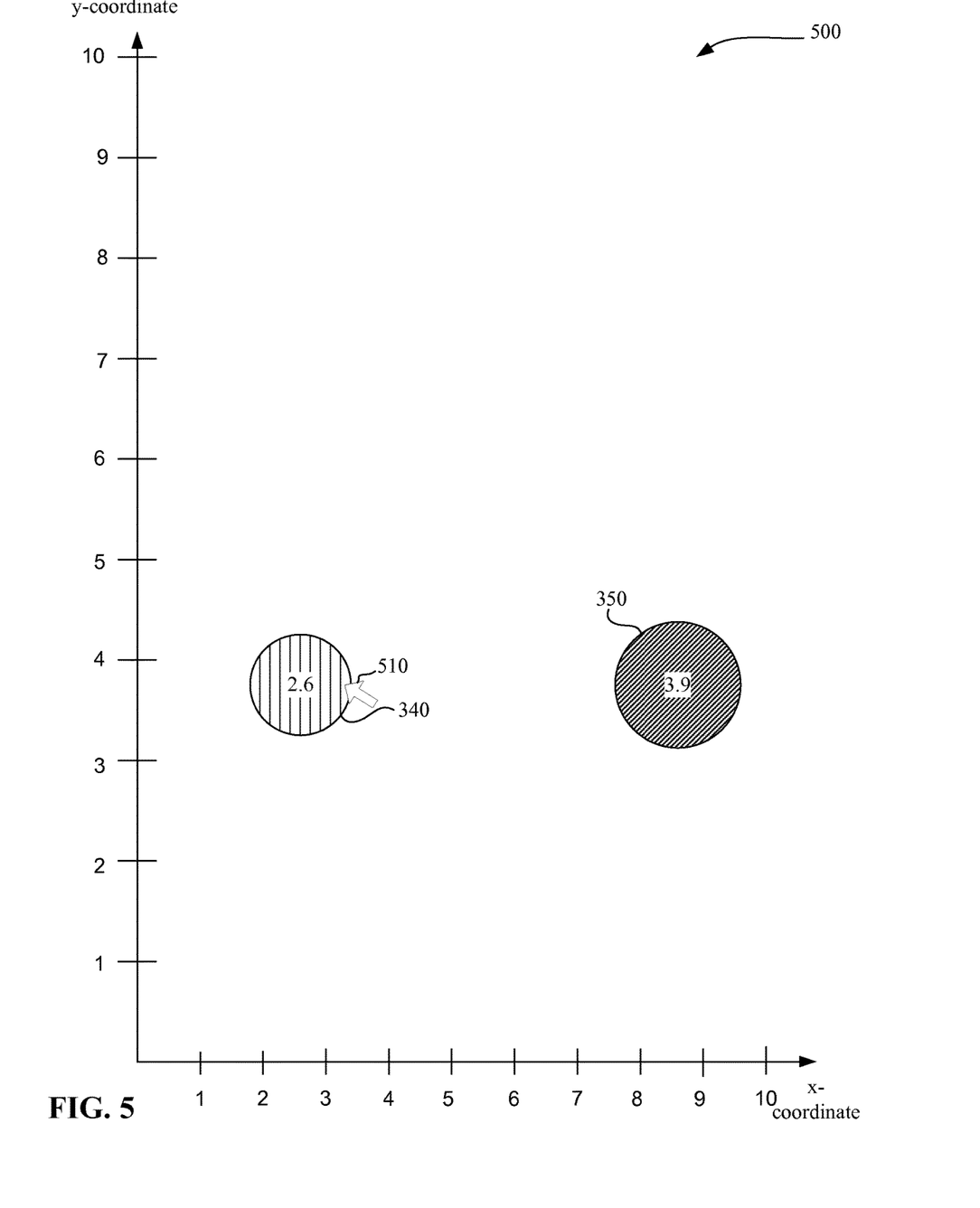
FIG. 5 depicts an alternative graphical display of the user interface of FIG. 4, according to an embodiment.

FIG. 5 illustrates a graph 500, according to one embodiment. The graph 500 may be contextual to a selection or have an emphasis dimension. For instance, a user may select an event, like one being analyzed in the graph 400 of FIG. 4. Once selected, the other events correlated or highly related to the first event may be emphasized. If the emphasized events are related, e.g., a SAN storage or networking switch being used by the server with the event, then they may remain the same color dimension while the color dimension of unrelated events fades or disappears. This feature may also work with other attributes. A common attribute between the events 320, 325, 330, 335, 340, 345, and 350 may be assigned to the emphasis dimension. If an event is selected on the graph display 400 any event that correlates with the selected event may be emphasized over the other events. For example, the time sensitivity attribute 222 may be assigned to the emphasis dimension instead of the y-coordinate dimension 306. If the user selects event 340 on the graph display 400, then event 350 may be emphasized over the remaining displayed events 320, 325, 330, 335, and 345 because it has a correlated attribute value or substantially similar attribute value to event 340. Events 340 and 350 may be emphasized by, but not limited to, remaining the same color while the other events fade or disappear. As shown in FIG. 5, event 340 may be selected with a selection tool 510. Event 350 may remain displayed while the other events 320, 325, 330, 335, and 345 of graph 400 are no longer displayed.

Figure 6:
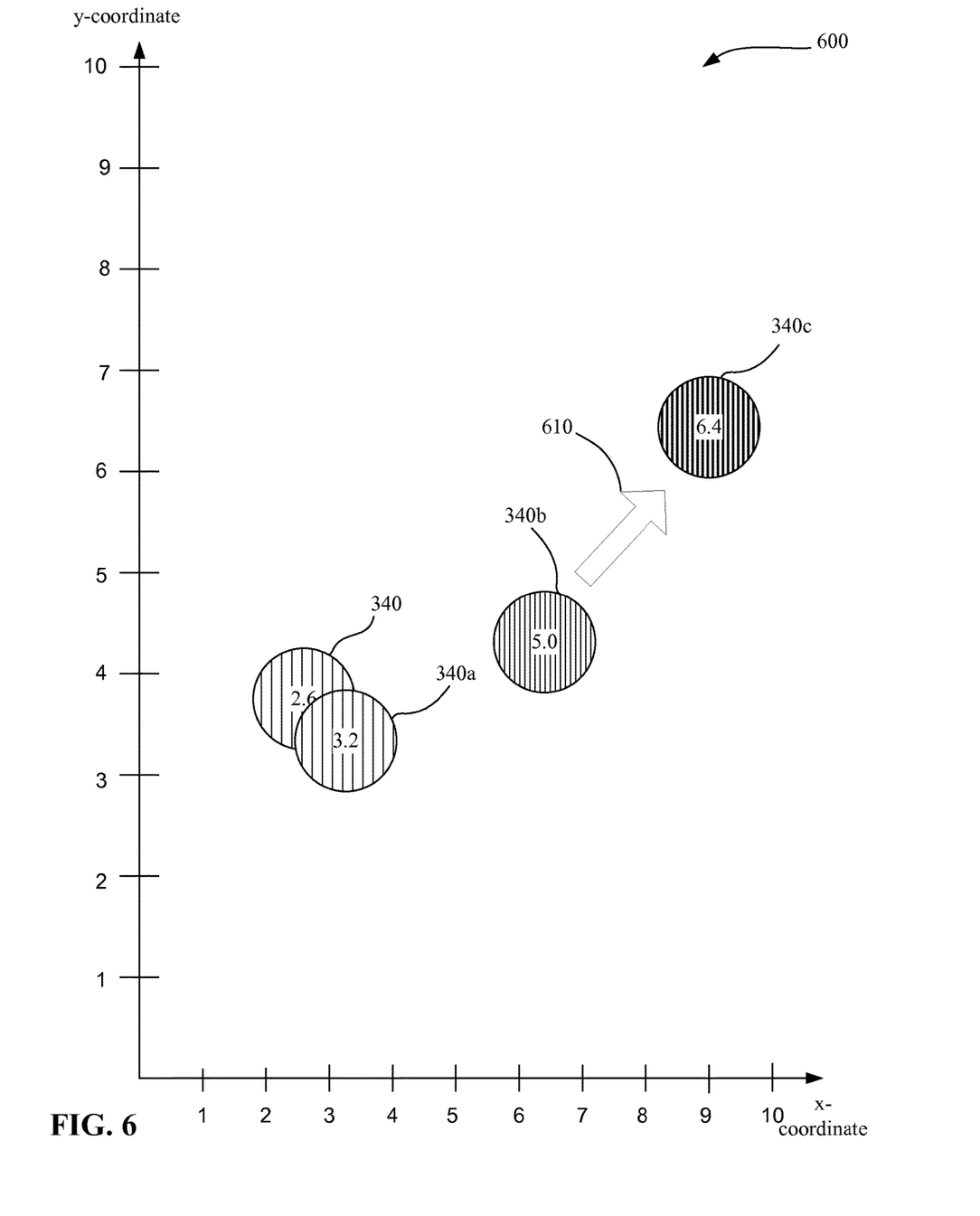
FIG. 6 depicts another alternative graphical display of the user interface of FIG. 4, according to an embodiment.

FIG. 6 illustrates graph 600, according to another embodiment. In graph 600, the bubbles may be tracked over time by displaying multiple bubbles for a single event. Showing multiple bubbles of the same event may illustrate the change in the event attribute over time. In graph 600, event 340 of FIG. 4 may be selected to be displayed and tracked over time. The system manager 136 may gather data about the event 340 at some time interval. Event 340a may be the event 340 after a first time interval. As illustrated in graph 600, event 340a may have more importance 220, cost 244, and potential to ripple 230 but less time sensitivity 222 than during the initial time of event 340. At a second time interval event 340 may be event 340b. At the second time interval, event 340b may have a greater importance 220, time sensitivity 222, cost 244, risk 226, and potential to ripple 230 than event 340 or event 340a.

In yet another embodiment, the graph 600 may forecast and show a vector 610 for potential changes if the event 340b is not resolved over a third time interval. For example, the user may hover a mouse pointer over event 340b. A predicted forecast of the event 340b over the third time interval may be overlaid on the same display as future event 340c. In FIG. 6, future event 340c may have even a greater importance 220, time sensitivity 222, cost 244, risk 226, and potential to ripple 230 than event 340, event 340a, or 340b. The system manager 136 may contain data of past events that are similar to a current event and keep track of the change in the attributes of the past event over time to make a prediction. Likewise, a user may enter data on how an event may progress over time.

Figure 7:
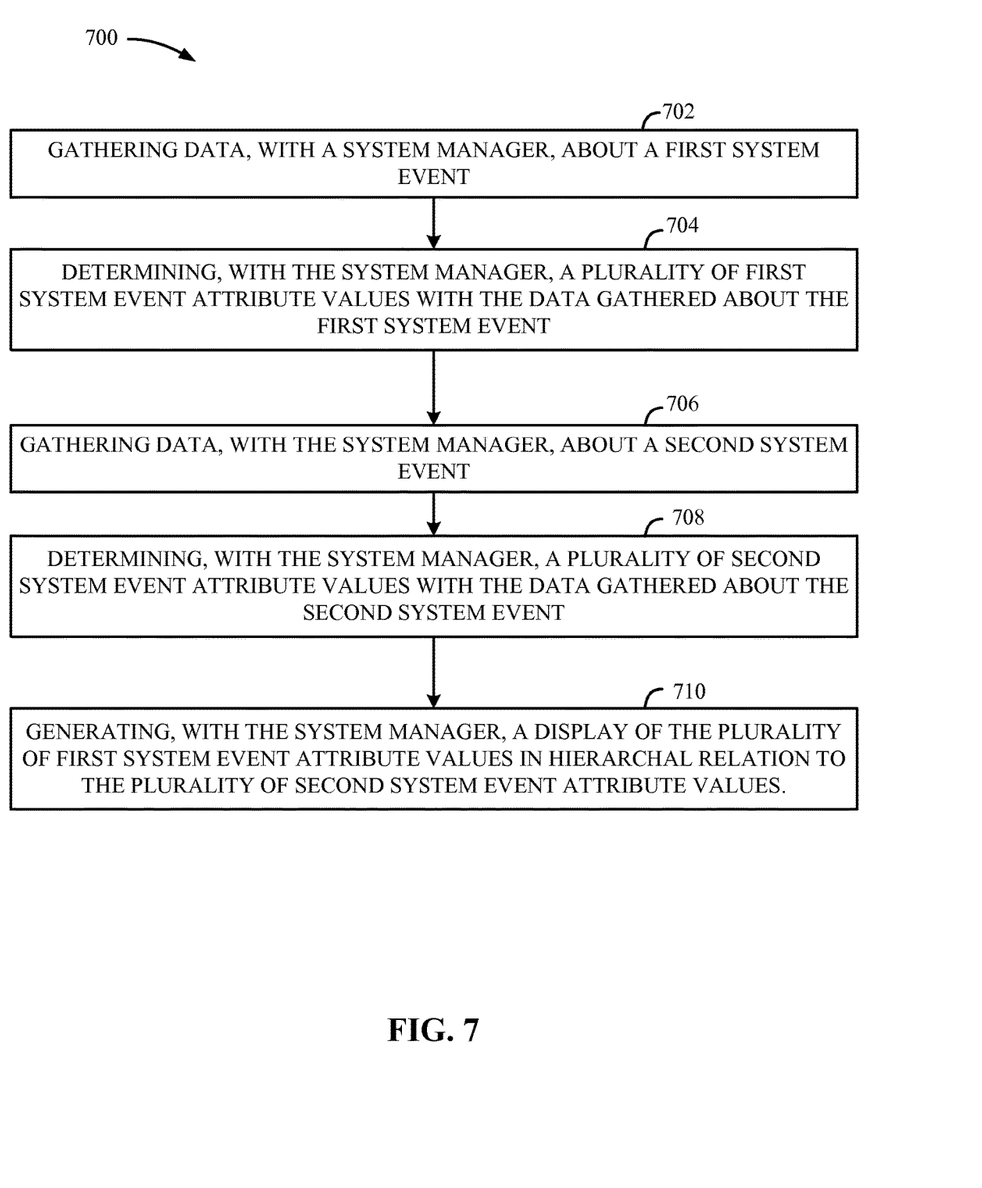
FIG. 7 depicts a flow chart of an exemplary method to generate a graphical display for events using two or more data attributes of the event, according to an embodiment.

FIG. 7 is a block diagram of a method 700 of managing a system, according to one embodiment. In operation 702, data is gathered, with the system manager 136, relating to a first system event. In operation 704, the determination, with the system manager 136, of a plurality of first system event attribute values with the data gathered about the first system event may occur. In operation 706, data is gathered, with the system manager 136, relating to a second system event. In operation 708, the determination, with the system manager 136, of a plurality of second system event attribute values with the data gathered about the second system event may occur. In operation 710, a display may be generated, with the system manger 136, of the plurality of first system event attribute values in hierarchal relation to the plurality of second system event attribute values.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 102 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method for managing a computer system, the method comprising:
    receiving, from a user utilizing a client device, user credentials and duties of the user;
    gathering, with a system manager, data about a first system event, the first system event referencing malfunction of a device within the computer system, wherein the system manager is located within main memory of a server that is communicatively connected to the client device over a network, wherein the main memory further includes an event data attribute value table, a dimensions table, and a values table;
    determining, with the system manager, a plurality of first system event attribute values based on the user duties, for a plurality of attributes, with the data gathered about the first system event,
    wherein the plurality of attributes includes: event ID attribute values, an event description attribute, a time/date attribute, a duration attribute, a source attribute, progress of resolution attribute, an importance attribute, a time sensitivity attribute, an urgency attribute, a risk attribute, a resolvability attribute, a ripple attribute, a redundancy attribute, an ownership and roles attribute, a frequency attribute, a scope attribute, a fuzziness attribute, an SLA attribute, and a cost attribute,
    wherein each attribute of the plurality of attributes includes a numeric value that indicates a severity of the attribute, wherein a higher numeric value represents a higher severity, wherein the severity is the importance of the attribute to the first system event;
    gathering, with the system manager, data about a second system event;
    determining, with the system manager, a plurality of second system event attribute values based on the user credentials, for the plurality of attributes, with the data gathered about the second system event;
    assigning each of the plurality of attributes to a different dimension from a set of dimensions based on the user credentials, the plurality of attributes comprising at least three attributes, the set of dimensions comprising at least three graph dimensions;
    generating, with the system manager, a graph based on the received user credentials, the graph comprising a first object representing the first system event using the plurality of first system event values according to the assigned dimensions and a second object representing the second system event using the plurality of second system event values according to the assigned dimensions;
    displaying a graphical user interface containing the graph on a display device, wherein the graph is in the form of an interactive report, and allowing, by the interactive report, the user to control and vary the assigned dimensions and scopes of the varied dimensions in the displayed graph;
    receiving, from the user, a selection of a particular dimension from the set of dimensions in a drop-down list to add to the graphical display;
    reassigning, with the system manager, a first attribute from the plurality of attributes to the selected particular dimension;
    receiving, from the user, a selection of the second system event within the generated graph;
    emphasizing, with the system manager, by displaying, within the generated graph, one or more system events and attributes that are correlated to the second system event in the same color as the selected second system event; and
    predicting, by the system manager analyzing historical data and user inputted data, a forecast of each attribute of the second system event and the one or more emphasized system events.

2. The method of claim 1, further comprising:
    tracking, with the system manager, changes of the plurality of first system event attribute values over a time interval, wherein the graph further comprises a third object representing the first system event using previous first system event attribute values from the time interval.

3. The method of claim 1, further comprising:
    tracking, with the system manager, changes of the plurality of first system event attribute values over a first time interval; and
    predicting, with the system manager, future attribute values for the first system event based on the tracked changes, wherein the graph further comprises a third object representing the first system event based on the future attribute values.

4. The method of claim 1, further comprising:
    assigning, with the system manager, one of the plurality of attributes to an emphasis dimension;
    receiving, through the graphical user interface, a selection of the first system event; and graphically emphasizing, in the graph, objects representing a set of events, the set of events each having a similar attribute value to a first events attribute value for the attribute assigned to the emphasis dimension.

5. The method of claim 1, further comprising:
    normalizing, with the system manager, the plurality of first system event attribute values and the plurality of second system event attribute values to a common scale.

6. The method of claim 1, wherein the set of dimensions comprises bubble size and bubble color.

7. The method of claim 1, wherein the plurality of attributes consists of attributes with attribute values that vary among events in the graph.

8. The method of claim 1, wherein the gathering data about the first system event comprises receiving data from sensors that detect and send data about components of the computer system.

9. The method of claim 1, wherein the gathering data about the first system event comprises receiving, from a user input device, data from a user of the system manager.

10. The method of claim 1, wherein the plurality of attributes comprises a risk attribute based on redundancy within the computer system.

11. The method of claim 1, wherein the graphical user interface allows a user to modify the assignment of attributes to graph dimensions.

12. A non-transitory computer readable storage medium having instructions stored thereon which, when executed, cause a processor to perform the following operations:
receiving, from a user utilizing a client device, user credentials and duties of the user;
gathering, with a system manager, data about a first system event, the first system event referencing malfunction of a device within a computer system, wherein the system manager is located within main memory of a server that is communicatively connected to the client device over a network, wherein the main memory further includes an event data attribute value table, a dimensions table, and a values table;
determining, with the system manager, a plurality of first system event attribute values based on the user duties, for a plurality of attributes, with the data gathered about the first system event,
wherein the plurality of attributes includes: event ID attribute values, an event description attribute, a time/date attribute, a duration attribute, a source attribute, progress of resolution attribute, an importance attribute, a time sensitivity attribute, an urgency attribute, a risk attribute, a resolvability attribute, a ripple attribute, a redundancy attribute, an ownership and roles attribute, a frequency attribute, a scope attribute, a fuzziness attribute, an SLA attribute, and a cost attribute,
wherein each attribute of the plurality of attributes includes a numeric value that indicates a severity of the attribute, wherein a higher numeric value represents a higher severity, wherein the severity is the importance of the attribute to the first system event;
gathering, with the system manager, data about a second system event;
determining, with the system manager, a plurality of second system event attribute values based on the user credentials, for the plurality of attributes, with the data gathered about the second system event;
assigning each of the plurality of attributes to a different dimension from a set of dimensions based on the user credentials, the plurality of attributes comprising at least three attributes, the set of dimensions comprising at least three graph dimensions;
generating, with the system manager, a graph based on the received user credentials, the graph comprising a first object representing the first system event using the plurality of first system event values according to the assigned dimensions and a second object representing the second system event using the plurality of second system event values according to the assigned dimensions;
displaying a graphical user interface containing the graph on a display device, wherein the graph is in the form of an interactive report, and wherein the interactive report being configured to allow the user to control and vary the assigned dimensions and scopes of the varied dimensions in the displayed graph,
receiving, from the user, a selection of a particular dimension from the set of dimensions in a drop-down list to add to the graphical display;
reassigning, with the system manager, a first attribute from the plurality of attributes to the selected particular dimension;
receiving, from the user, a selection of the second system event within the generated graph;
emphasizing, with the system manager, by displaying, within the generated graph, one or more system events and attributes that are correlated to the second system event in the same color as the selected second system event; and
predicting, by the system manager analyzing historical data and user inputted data, a forecast of each attribute of the second system event and the one or more emphasized system events.

13. The storage medium of claim 12, wherein the operations further comprise:
tracking changes of the plurality of first system event attribute values over a time interval, wherein the graph further comprises a third object representing the first system event using previous first system event attribute values from the time interval.

14. The storage medium of claim 12, wherein the operations further comprise:
tracking, with the system manager, changes of the plurality of first system event attribute values over a first time interval; and
predicting future attribute values for the first system event based on the tracked changes, wherein the graph further comprises a third object representing the first system event based on the future attribute values.

15. The storage medium of claim 12, wherein the operations further comprise:
assigning one of the plurality of attributes to an emphasis dimension;
receiving, through the graphical user interface, a selection of the first system event; and
graphically emphasizing, in the graph, objects representing a set of events, the set of events each having a similar attribute value to a first event's attribute value for the attribute assigned to the emphasis dimension.

16. The storage medium of claim 12, wherein the operations further comprise:
normalizing the plurality of first system event attribute values and the plurality of second system event attribute values to a common scale.

17. The storage medium of claim 12, wherein the set of dimensions comprises bubble size and bubble color.

18. The storage medium of claim 17, wherein the plurality of attributes consists of attributes with attribute values that vary among events in the graph.

* * * * *